(12) United States Patent
Mahadevan et al.

(10) Patent No.: US 9,503,365 B2
(45) Date of Patent: Nov. 22, 2016

(54) REPUTATION-BASED INSTRUCTION PROCESSING OVER AN INFORMATION CENTRIC NETWORK

(71) Applicant: Palo Alto Research Center Incorporated, Palo Alto, CA (US)

(72) Inventors: Priya Mahadevan, Sunnyvale, CA (US); Glenn C. Scott, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 222 days.

(21) Appl. No.: 14/456,749

(22) Filed: Aug. 11, 2014

(65) Prior Publication Data

US 2016/0043940 A1 Feb. 11, 2016

(51) Int. Cl.
*G06F 15/173* (2006.01)
*H04L 12/721* (2013.01)
*H04L 29/06* (2006.01)
*H04L 29/08* (2006.01)

(52) U.S. Cl.
CPC ............ *H04L 45/566* (2013.01); *H04L 63/10* (2013.01); *H04L 67/34* (2013.01); *H04L 69/22* (2013.01)

(58) Field of Classification Search
CPC ..... H04L 45/566; H04L 63/10; H04L 67/34; H04L 69/22
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Krisna Lim
(74) *Attorney, Agent, or Firm* — Shun Yao; Park, Vaughan, Fleming & Dowler LLP

(57) ABSTRACT

A packet-forwarding network node can process a programmable packet based on a reputation value for a name prefix to perform a customized operation on a local resource. The programmable packet can include a name prefix, and a header comprising reputation criteria for the packet's name prefix and one or more resource fields. A resource field can include instructions that perform an operation on a corresponding resource of the network node. When the network node receives the programmable packet, the node determines a reputation value for the name prefix at the local node, and compares this reputation value to the packet's reputation criteria. If the reputation value for the name prefix at the local node satisfies the reputation criteria, the node proceeds to execute the one or more instructions of the respective resource field to perform the operation on the corresponding resource.

25 Claims, 11 Drawing Sheets

(56) References Cited

U.S. PATENT DOCUMENTS

| | | |
|---|---|---|
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| RE39,360 E * | 10/2006 | Aziz .............. H04L 12/22 380/277 |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,069,023 B1 * | 11/2011 | Frailong .............. G06F 9/3004 370/389 |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0233916 A1 * | 11/2004 | Takeuchi .......... H04L 29/12066 370/395.54 |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |

(56) References Cited

U.S. PATENT DOCUMENTS

| | | |
|---|---|---|
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1* | 4/2010 | Garcia-Luna-Aceves ............ H04W 40/02 370/328 |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |

(56) References Cited

U.S. PATENT DOCUMENTS

| | | |
|---|---|---|
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | Dekozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", Sigcomm '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: An architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd USENIX Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

B. Lynn$2E.

Bari, MdFaizul, et al. 'A survey of naming and routing in information-centric networks.' Communications Magazine, IEEE 50.12 (2012): 44-53.

(56) References Cited

OTHER PUBLICATIONS

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D. Boneh, C. Gentry, and B. Waters, Collusi.

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and a.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable Icn. In ACM SIGCOMM Computer Communication Review (vol. 43, No. 4, pp. 147-158). ACM.

G. Ateniese, K. Fu, M. Green, and S. Hohenberger. Improved Proxy Reencryption Schemes with Applications to Secure Distributed Storage. In the 12th Annual Network and Distributed System Security Sympo.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedngs of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peerto-Peer to-Peer Overlays." NSDI. vol. 4. 2004.

H. Xiong, X. Zhang, W. Zhu, and D. Yao. CloudSeal: End-to$2.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from Hvac Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hogue et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer Sciencevol. 5443 (2009).

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

(56) References Cited

OTHER PUBLICATIONS

Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." Hvac&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: a multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. Eurocrypt 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: a survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for CCN," In Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. Cans. Spring Lecture Notes in Computer Science vol. 5339 (2008).
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Deering, "Multicast Routing in Internetworks and Extended LANs," Proc. ACM SIGCOMM '88, Aug. 1988.
S. Deering et al., "The Pim architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based Pomdp solvers." Autonomous Agents and Multi-Agent Systems 27.1 (2013): 1-51.
Sheppard, John W., and Stephyn Gw Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

(56) References Cited

OTHER PUBLICATIONS

V. K. Adhikari, S. Jain, Y. Chen, and Z.-L. Zhang. Vivisecting Youtube:an Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-Cdn Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet", IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

\* cited by examiner

REPUTATION RECORD 200

| NAME PREFIX 202 | FACE 204 | REPUTATION VALUE 206 |
|---|---|---|
| /bbc/headlines | C | 65% |
| /bbc/headlines | B | 60% |
| /bbc/headlines | A | 60% |
| /cnn/headlines | 0 | 60% |
| /netflix/video | D | 50% |

FIG. 2

REPUTATION-BASED INSTRUCTION PROCESSING OVER AN INFORMATION CENTRIC NETWORK

RELATED APPLICATION

The subject matter of this application is related to the subject matter of the following applications:

U.S. patent application Ser. No. 14/066,475, entitled "Software-defined Named-Data Networking," by inventors Glenn C. Scott, Priya Mahadevan, and Marc E. Mosko, filed on 29 Oct. 2013; and U.S. patent application Ser. No. 14/335,806, entitled "Reputation-based Strategy for Forwarding and Responding to Interests over a Content Centric Network," by inventors Priya Mahadevan and Glenn C. Scott, filed on 18 Jul. 2014; the disclosures of which are incorporated by reference in their entirety herein.

BACKGROUND

Field

This disclosure is generally related to computer networks. More specifically, this disclosure is related to a network node that uses reputation values for a name prefix to determine whether to execute instructions included in a packet that perform operations on a resource of the network node.

Related Art

The proliferation of mobile computing and cellular networks is making digital content more mobile than ever before. People can use their smartphones to generate content, to consume content, or even to provide Internet access to other computing devices that generate or consume content. Oftentimes, a device's network location can change as a person takes this device to a new physical location. This can make it difficult to communicate with this device under a traditional computer network (e.g., the Internet) when the device's new network location is not known.

To solve this problem, information-centric network architectures have been designed to facilitate accessing digital content based on its name, regardless of the content's physical or network location. Content-centric Networking (CCN) is an example of an Information-centric networking (ICN) architecture. However, a typical CCN architecture is limited to forwarding two types of packets: Interests and Content Objects. Interests include a name for a piece of named data (and serve as a request for the piece of named data), but are not ideal for transferring data as they do not include a payload. Content Objects, on the other hand, typically include a payload, and are only forwarded along a network path that has been traversed by an Interest with a matching name, and traverse this path in the reverse direction taken by the Interest packet. Content Objects are also only sent as a response to an Interest packet; Content Objects are never sent unsolicited in a CCN network.

Unfortunately, this typical CCN architecture does not allow custom operations to be performed on certain Interests or Content Objects. CCN network nodes typically process Interests and Content Objects unconditionally, and in a pre-defined way. Some network nodes may be pre-configured to process an Interest by searching through the local cache based on the Interest's structured name, or to forward the Interest via an interface (or a list of interfaces) mapped to its structured name. In either case, a system administrator typically configures, ahead of time, how a network's nodes are to process all Interests and Content Objects that it receives.

SUMMARY

One embodiment provides a packet-forwarding network node of an Information Centric Network (ICN) that processes a programmable packet based on a reputation value for a name prefix to perform a customized operation on a local resource. Content Centric Networking (CCN) is an example of an Information-centric networking architecture. During operation, the network node can receive a programmable packet that includes a name or a name prefix, and includes a header comprising reputation criteria and one or more resource fields. A respective resource field can include one or more instructions that perform an operation on a corresponding resource of the computing device. The network node analyzes the packet to determine reputation criteria for the packet's name prefix, and determines a reputation value for the name prefix at the local network device. If the network node determines that the reputation value for the name prefix at the local network node satisfies the reputation criteria, the network node proceeds to execute the one or more instructions of the respective resource field to perform the operation on the corresponding resource.

The packet contains a name (typically location-independent) that can be used to forward the packet. The packet can also carry instructions that can be executed to manipulate a network's resources. For example, network nodes may process a packet as a data-requesting packet (e.g., an Interest packet), or as a data-carrying packet (e.g., a Content Object), depending on instructions included in the packet. The packet may include a header that includes the instructions that govern how the packet is to be processed. The packet may also include a payload, which can carry data (similar to a Content Object), and/or can carry instructions or programs that can be processed by a network device. The instructions from the packet's header or payload can cause the network device to create, read, update, or delete (CRUD) data at a resource accessible by the network device.

In some embodiments, the system can execute instructions included in the packet to perform fundamental CCN operations. In CCN, all content is named, and each piece of data is bound to a unique name that distinguishes the data from any other piece of data, such as other versions of the same data or data from other publishers. This unique name allows a network device to request the data by disseminating an Interest that includes the name (or a name prefix), and can obtain the data independent from the data's storage location, network location, application, and means of transportation. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

The following terms describe elements of a CCN architecture:

Content Object: A single piece of data, which is bound to a unique name. Content Objects are "persistent," which means that a Content Object can move around within a computing device, or across different computing devices, but does not change. If any component of the Content Object changes, the entity that made the change creates a new Content Object that includes the updated content, binds the new Content Object to a new unique location-independent name.

Unique Names: A name in an ICN (e.g., CCN) is typically location independent and uniquely identifies a Content Object. A data-forwarding device can use the name or name prefix to forward a packet toward a network node that generates or stores the Content Object, regardless of a network address or physical location for the Content Object. In some embodiments, a CCN name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

Other name structures are also possible. For example, in ICN, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes the name (or name prefix) for the data. A data consumer can disseminate an Interest across a named-data network, which CCN routers can propagate toward a storage device (e.g., a cache server) or a data producer that can provide the a matching Content Object to satisfy the Interest.

In some embodiments, the reputation criteria include at least one of a minimum reputation value, a maximum reputation value, and a range of reputation values.

In some embodiments, while determining the reputation value for the name prefix at the local network device, the network node can compute a reputation value for a collection of Content Objects associated with the name prefix, which have been received or cached by the local network device. The reputation value can include a mean or median reputation value of the collection, a highest or lowest reputation value of the collection, or a range of reputation values for the collection.

In some embodiments, the packet can also include reputation information computed for the name prefix by a neighboring node. The local network node can compute the one or more instructions that cause the network node to determine an interface from which the packet arrived, and store the packet's reputation information in association with the name prefix and the interface.

In some embodiments, the reputation information can include a reputation value, as well as a set of attribute values and weights used to compute the reputation value.

In some embodiments, the packet also includes remote reputation information for Content Objects of the name prefix from the local network device. The local network node can execute the packet's instructions that cause the network node to determine whether a reputation value obtained or computed from the remote reputation information is lower than the local reputation value for the name prefix, and compute a difference between the local reputation value for the name prefix and the remote-computed reputation value. The packet's instructions can also cause the network node to perform a remedial action if the value from the remote reputation information is lower than the local reputation value, and the computed difference is greater than a predetermined threshold.

In some embodiments, the remedial action can include diagnosing a reason for the difference in reputation values, sending a face's reputation information for the name prefix via the face to inform a neighboring node of its reputation value for the name prefix, and/or adjusting QoS parameters to receive content associated with the name prefix from a face with a highest reputation value.

In some embodiments, the resource includes at least one of a forwarding information base (FIB), a pending interest table (PIT), a content store (CS), a processing unit, a memory, a virtual memory, a storage device, a network interface, and a virtual interface.

In some embodiments, the instruction can include at least one of a create instruction for creating a new entry in the resource, a read instruction for reading an entry of the resource, an update instruction for updating an existing entry of the resource, and a delete instruction for deleting an existing entry of the resource.

BRIEF DESCRIPTION OF THE FIGURES

FIG. 2 illustrates an exemplary data structure that associates a reputation value with a name prefix and/or interface according to an embodiment.

In the figures, like reference numerals refer to the same figure elements.

DETAILED DESCRIPTION

Figure 1:
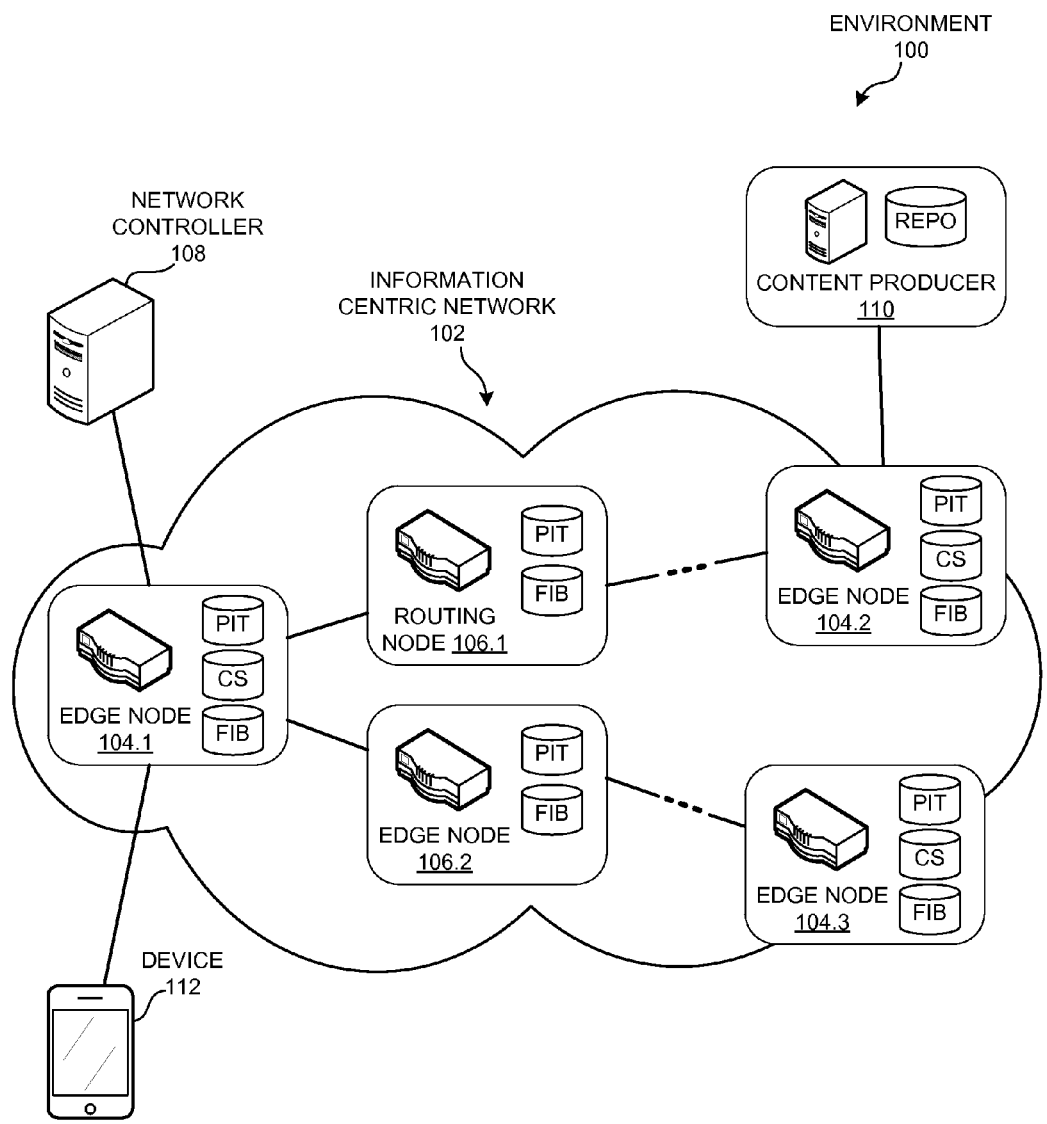
FIG. 1 illustrates an exemplary computing environment that processes a programmable packet based on the packet's reputation criteria in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a packet-forwarding system that solves the problem of performing instructions on a resource based on reputation information for a name prefix that the instructions are to operate on. For example, a network node of an information-centric network (ICN), a content-centric network (CCN), or a named-data network (NDN) can compute reputation values for various name prefixes associated with a resource. The resource can include, for example, a content store (CS), a forwarding information base (FIB), a pending Interest table (PIT), or a face (e.g., a virtual interface or physical interface). The node can compute a reputation value for the name prefix at the resource based on a set of attributes, and a weight for each attribute. The reputation value can fall within a predetermined range (e.g., [0,1], or [0, 100]), such that higher values indicate a higher trustworthiness for the name prefix at the resource. Also, when the node stores a Content Object in a Content Store, the node can also store reputation information in association with the Content Object. This reputation information can include the reputation value, along with the attributes and weights used to compute the reputation value. A description of reputation information and the methods for computing and using reputation values is described in U.S. Patent Application No. 14/335,806, entitled "REPUTATION-BASED STRATEGY FOR FORWARDING AND RESPONDING TO INTERESTS OVER A NAMED DATA NETWORK," by inventors Priya Mahadevan and Glenn C. Scott, filed Jul. 18, 2014, which is hereby incorporated by reference.

The network node can receive a packet that includes instructions to perform on a resource, and includes reputation criteria that controls whether the instructions are to be performed on the resource. The network node can compute a reputation value for the name prefix at the resource (or can access a pre-computed reputation value from a lookup table), and determines whether to process the packet by comparing the reputation value to the packet's reputation criteria. If the packet's reputation criteria are satisfied, the network node determines how to process the packet by obtaining the instructions from the packet itself. A description of programmable packets is described in U.S. patent application Ser. No. 14/066,475, entitled "SOFTWARE-DEFINED NAMED-DATA NETWORKING," by inventors Glenn C. Scott, Priya Mahadevan, and Marc E. Mosko, filed 29 Oct. 2013), which is hereby incorporated by reference.

In some embodiments, the system can receive a packet that indicates whether the packet is to be processed similar to an Interest or a Content Object, or needs to be processed in a custom way. For example, the packet can include instructions that read a router's FIB and/or create an entry into a PIT, to forward the packet in a way similar to an Interest. As another example, the packet can include instructions that read a router's PIT to return the packet in a way similar to a Content Object that satisfies the Interest.

The packet can also be used to perform advanced operations on any ICN, CCN, or NDN architecture that is now known or later developed. For example, the packet can include a payload, and can include instructions that access a router's FIB to push the packet's payload toward one or more network devices that are associated with a given name prefix.

Exemplary Computing Environment

In some embodiments, a system administrator can configure or reconfigure one or more routers across a network by disseminating a packet that includes instructions for deploying the desired changes to the network. The packet can include instructions that configure a router to create, update, or delete one or more entries in a FIB, for example, to establish new route paths and/or to tear down other route paths. The packet can also include instructions that establish Quality of Service (QoS) requirements at a router, such as to perform traffic shaping on an interface of the router.

FIG. 1 illustrates an exemplary computing environment 100 that processes a programmable packet based on the packet's reputation criteria in accordance with an embodiment. Computing environment 100 can include a named-data network 102 (or an information-centric network), which includes a plurality of edge nodes 104 and routing nodes 106.

Edge nodes 104 and routing nodes 106 can each compute local reputation values for a set of name prefixes, or for a combination name prefixes and the face from which they were received. A CCN node can compute a reputation value as a numeric value using a customizable calculation designed to weigh quantifiable factors that could assist the node to meet specific objectives. These factors can be quantified by numeric attributes such as the latency or bandwidth of an interface for a particular name prefix, or the success rate for verifying Content Object signatures for a particular name prefix coming from an interface. An attribute is a quantifiable property, policy, or characteristic that a node can measure to make an informed decision.

A system administrator for a CCN node can assign a weighted value to each attribute so that the computed reputation value achieves a desired objective. The objectives can include, for example, providing a continuous video-streaming experience to a user, or to provide authentic data that has not been forged or tampered with. A network node or its system administrator may assign weight values to an interface's attributes based on an Interest's name prefix, or based on an objective associated with the name prefix. Hence, a name prefix associated with video streams (e.g., "/netflix") can be associated with attribute weights to faces that can provide a continuous video-streaming experience to users.

Both edge nodes 104 and routing nodes 106 can process packets by executing instructions included in these packets if the local reputation value for the name prefix or for the name-prefix/face combination satisfies the packet's reputation criteria. For example, network 102 can be managed by an Internet service provider (ISP), and can include an edge node 104.1 that provides network access to a plurality of client devices. Network 102 can also include an edge node 104.2 that provides network access to a plurality of online services, and/or that interfaces with a back-haul network accessible by a plurality of online services.

Computing environment 100 can also include other network devices that can disseminate packets across network 102. For example, an online-service provider can deploy an online service at a content producer 110 that is accessible via network 102. Content producer 110 can include a server computer or a computer cluster that interfaces with edge node 104.2 of network 102. However, routing nodes 106 are best able to route a packet to content producer 110 when routing nodes 106 include a FIB entry that maps the packet's name or name prefix to an optimal local interface that can best reach content producer 110.

In some embodiments, the online-service provider can use a network controller 108 to configure and maintain an optimal route path to content producer 110 for a given name prefix. This optimal path can start from an ingress edge node that provides network access to a plurality of client devices, and reaches an egress edge node 104.2 along a path to content producer 110.

Network controller 108 can generate a packet that specifies reputation criteria, and includes instructions for accessing the FIB to delete any FIB entries for the name prefix whose reputation value is below the reputation criteria. The packet can also include instructions that read the FIB to forward the packet toward content producer 110 via any remaining FIB entries associated with the name prefix.

In some embodiments, a network device can generate packets that include the instructions necessary to send or obtain a certain piece of data via any faces that satisfy the reputation criteria. For example, client device 102 can generate a packet that contains a name or name prefix for the piece of data, includes reputation criteria, and also includes instructions for accessing the FIB to obtain a FIB entry that satisfies the reputation criteria. Client device 102 can then disseminate this packet across network 102 to obtain the data from a device of network 102 that has a sufficiently high reputation and can satisfy the packet's request for the data. Routers that receive this packet execute the instructions that read the FIB to obtain a FIB entry for the name prefix that satisfies the reputation criteria, and forwards the packet via a face indicated by the FIB entry.

Also, in some embodiments, client device 112 can push data toward content producer 110 by also attaching the data as a payload in the packet. The packet can specify reputation criteria that are to be used when caching the payload, and includes instructions indicating whether the payload is to be cached by a routing node. For example, a routing node (e.g., edge nodes 104.1 and 104.2) can include a content store (CS) to cache payload data from network packets that pass through network 102 (e.g., to cache Content Objects). If the routing node detects that a packet includes instructions that perform a write or update operation on a CS resource, the routing node can store the packet's payload in the CS if the face from which the node received the packet has a reputation value (for the name prefix) that satisfies the packet's reputation criteria.

On the other hand, the packet can include instructions that delete entries from the CS resource, and can include reputation criteria that specify a maximum reputation value for CS entries that are to be deleted. The routing node can search the CS for data associated with the packet's name prefix that satisfies the reputation criteria. If this data exists in the CS, the routing node can delete this data from the CS.

FIG. 2 illustrates an exemplary data structure 200 that associates reputation information with a name prefix and/or interface according to an embodiment. Column 202 stores entries for one or more name prefixes (e.g., a content name, or name prefix), and column 204 stores an associated face for the namespace. Column 206 stores an associated reputation value for a given namespace at the corresponding prefix. Data structure 200 can also include additional columns for storing other reputation information, such as to store a set of attributes and weights used to compute the reputation value.

In some embodiments, data structure 200 may correspond to a Forwarding Information Base (FIB) that assigns reputation information (e.g., a reputation value) to each FIB entry. As depicted in FIG. 2, there are five example forwarding rule entries in data structure 200 for the FIB. The namespace "/bbc" is mapped to faces A, B, and C. The name prefix "/bbc" at face C has a reputation value of 65%, while the name prefix "/bbc" at either face A or face B has a reputation value of 60%. The FIB entry for name prefix "/netflix" specifies that name prefix "/netflix" is mapped to a face D, and that "/netflix" at face D has a reputation value of 50%.

The data structure can also assign a reputation value to a name prefix, across all faces. For example, data structure 200 does not map the name prefix "/cnn" to any face, which is indicated by a number zero in face column 204. However, reputation value column 204 for the "/cnn" entry can specify a reputation value of 60%.

In some other embodiments, data structure 200 can correspond to a Content Store that assigns reputation information (e.g., a reputation value) to each cached Content Object. Column 202 stores the namespace of a cached Content Object, and column 204 can specify a face from which the Content Object was cached. Column 206 stores a reputation value computed for the Content Object received via the corresponding face of column 204, based on attribute values for the name prefix and face at the time the Content Object was cached.

Figure 3A:
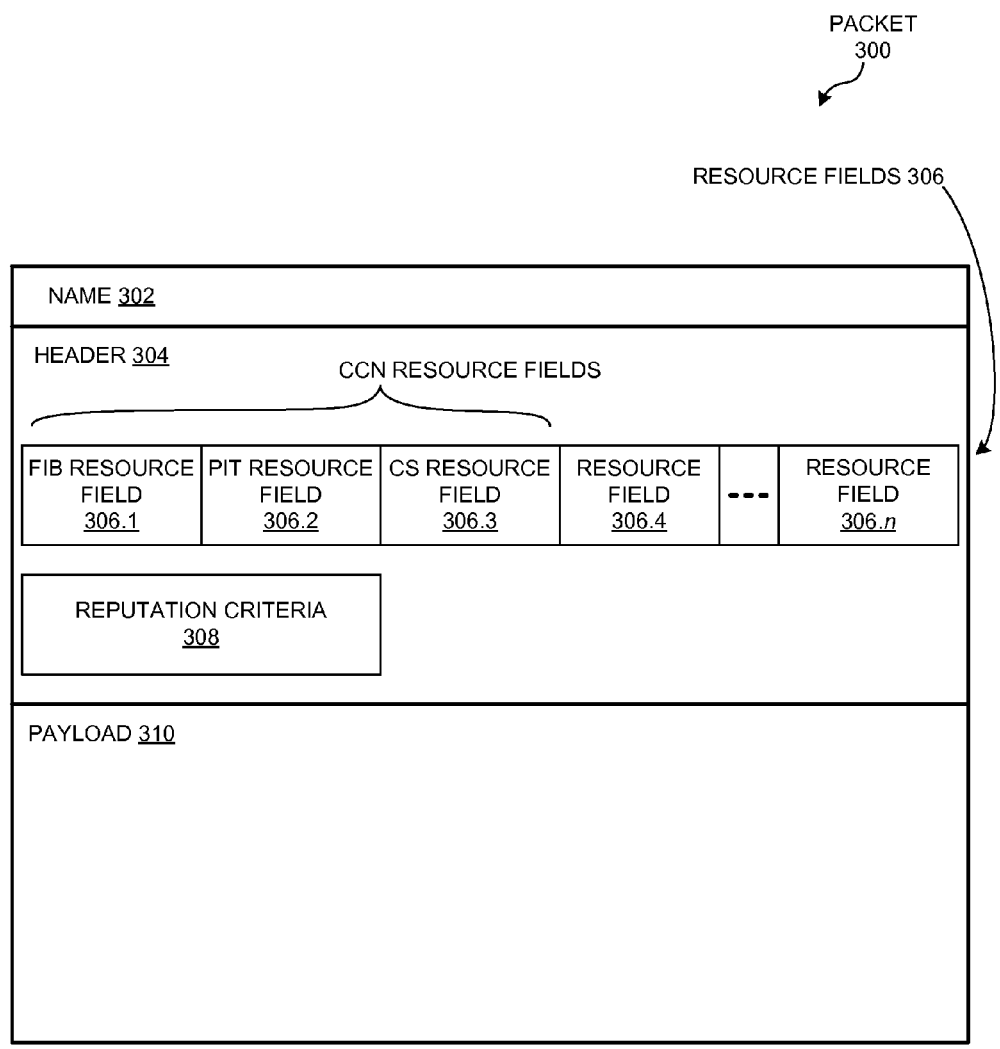
FIG. 3A illustrates an exemplary network packet in accordance with an embodiment.

FIG. 3A illustrates an exemplary network packet 300 in accordance with an embodiment. Specifically, packet 300 can include a name (or name prefix) 302, and a header 304 that includes instructions that are to be executed against one or more resources of a forwarding node, and can include a reputation criteria 308 that governs when a network node is to execute the instructions on a resource. Header 304 can include a plurality of resource fields 306, such that each resource field is associated with a resource of the forwarding node, and includes instructions for the corresponding resource. Packet 300 can also include a payload 310 that can hold data for a target device, or can hold data to be used by a router while executing instructions from one or more of the resource fields.

Resource fields 306 can include a set of fields for resources of a CCN, NDN, or ICN architecture, such as a FIB resource field 306.1 for a Forwarding Information Base, a PIT resource field 306.2 for a Pending Interest Table, and a CS resource field 306.3 for a Content Store. For example, resource fields 306.1 and 306.2 may include a "write" instruction for a PIT and a "read" instruction for a FIB, which causes a forwarding node to process the packet like an Interest if the reputation value for the name prefix satisfies reputation criteria 308. Also, if a network node can satisfy the Interest (e.g., by generating or retrieving the requested data), the network node can generate another packet that includes the same name for the data, but that also includes a set of programmed header fields that send the packet back to the initial packet's source. This new packet can include a PIT resource field 306.2 that includes a "read" instruction for the PIT, which causes the forwarding nodes to process the packet like a Content Object. These nodes process PIT resource field 306.2 to forward the packet via an interface from which the corresponding request or Interest was received. Further, the packet's data (payload) can also be cached in the CS. In some embodiments, the new packet's header can also include any reputation criteria specified in network packet 300 (e.g., reputation criteria 308).

Resource fields 306 can also include one or more fields for any other network-device resources now known or later developed. These additional resources can support additional features that are deployed at a network node, or can support additional features of a higher-level named-data networking architecture or information-centric networking architecture. For example, network nodes can also include a "metrics" resource that records various metrics for the network node. Name 302 can specify a name prefix for the metrics to collect, and a "read" instruction in a metrics resource field can cause the network node to compile a report of various performance metrics related to the name prefix. If the reputation value for the name prefix satisfies reputation criteria 308, the network node executes the instructions in the resource field to generate a new packet that includes the metrics report, and to return the new packet.

As another example, a "QoS" resource can reconfigure routing behavior at a network node based on a packet that includes instructions to execute against the QoS resource. A QoS resource field can include a "create" or "update" instruction that enters a traffic-shaping configuration into the QoS resource. This traffic-shaping configuration can indicate, for example, a maximum bandwidth for a given name prefix at a given interface. The name prefix can include the root "l" name prefix to enter the traffic-shaping configuration across all name prefixes, or can include a specific non-root name prefix (e.g., /bbc/headlines) to enter a traffic-shaping configuration for this name prefix at the given interface. Also, a QoS resource field can include a "read" or "delete" instruction that reads or removes a traffic-shaping configuration for a given interface.

In some embodiments, the network node can execute the instructions against the QoS resource if the reputation value for the name prefix satisfies reputation criteria 308. For example, an administrator can issue one QoS-configuring packet whose reputation criteria 308 specifies a minimum reputation threshold for entering a first traffic-shaping configuration, and can issue another QoS-configuring packet whose reputation criteria 308 specifies a maximum reputation threshold for entering a second traffic-shaping configuration. Hence, if the second traffic-shaping configuration specifies a lower bandwidth configuration than the first traffic-shaping configuration, then these two QoS-configuring packets can effectively suppress interfaces with a low reputation value for a name prefix while allowing a higher bandwidth to other interfaces with a high reputation value for the name prefix.

Figure 3B:
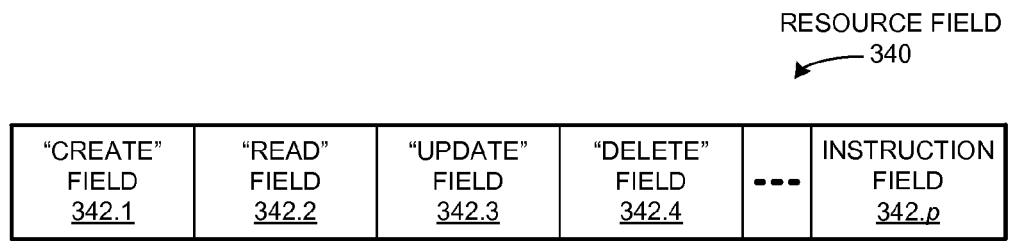
FIG. 3B illustrates an exemplary resource field that includes a set of instruction fields in accordance with an embodiment.

FIG. 3B illustrates an exemplary resource field 340 that includes a set of instruction fields 342 in accordance with an embodiment. Each instruction field can correspond to a predetermined operation that can be performed on a corresponding resource. For example, a FIB, a PIT, and a CS can each store data that can be used to forward a data-requesting packet (e.g., an Interest), or for caching or returning data (e.g., a Content Object). Hence, resource field 340 can include a field for each of various basic functions that can be performed on persistence storage, such as "create," "read," "update," and "delete" (CRUD). The network node can perform these functions on a local resource based on a packet's name or name prefix. A "create" field 342.1 indicates whether a network node is to create an entry in a resource, and a "read" field 342.2 indicates whether the network node is to read an entry from the resource. An "update" field 342.3 indicates whether the network node is to update an existing resource entry, and a "delete field 342.4 indicates whether the network node is to delete an existing entry of the resource.

In some embodiments, each instruction field may include a flag, such as a single bit or a group of bits (e.g., a byte or a word) that indicate whether the corresponding instruction or operation is to be performed. For example, an instruction field that includes a binary '1' value is interpreted as "indicating" or "including" an instruction associated with the instruction field that the network node is to execute against the corresponding resource. An instruction field that includes a binary '0' value is interpreted as not including the instruction associated with the instruction field, or can be interpreted as indicating that the operation associated with the instruction field is not to be performed on the corresponding resource. If the forwarding node determines that an instruction field is set in the packet, and that the local reputation value for the name prefix satisfies the reputation criteria, the forwarding node can determine one or more instructions that correspond to the instruction field (e.g., binary instructions), and executes these instructions on the resource to process the packet.

The instruction field can also include an explicit set of instructions that when executed by the forwarding node, cause the forwarding node to manipulate or otherwise perform operations on the resource to process the packet. These instructions can include a script (e.g., instruction written in an interpreted language), or can include a standalone program (e.g., binary instructions executed by a processor or a virtual machine). A forwarding node can execute these instructions to perform a CRUD operation in a custom way, such as to selectively create, update, or delete FIB entries to configure how the forwarding node forwards packets.

In some embodiments, a packet can also perform a custom "create" or "update" operation on a FIB entry to dynamically change routes on-the-fly as the packet traverses the network toward a target network node associated with the packet's name or name prefix. For example, the FIB resource field can include a "delete" instruction that removes FIB entries for failed links or for interfaces whose reputation value is above or below the reputation criteria, and can include a "create" or "update" instruction to update the FIB in a way that diverts network traffic away from over-utilized interfaces and toward less-utilized interfaces.

Figure 3C:
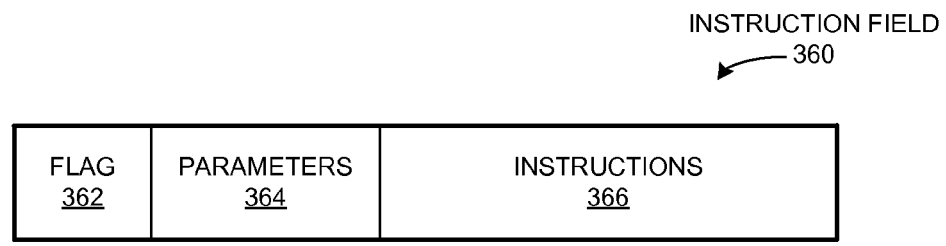
FIG. 3C illustrates an exemplary instruction field that includes an explicit set of instructions in accordance with an embodiment.

FIG. 3C illustrates an exemplary instruction field 360 that includes an explicit set of instructions in accordance with an embodiment. Specifically, instruction field 360 can include a flag 362, a set of parameters 364, and a set of instructions 366. Flag 362 can include a single bit, or a group of bits that indicate whether the corresponding operation is to be performed.

Parameters 364 can include any additional data necessary for performing the "create," "read," "update," or "delete" instruction or operation. For example, a "read" instruction field for the FIB resource can include parameters 364 that indicate a number of hops to use when forwarding a packet. As another example, a "create" or "update" instruction field for a FIB resource or a PIT resource can include parameters

364 that include the data that is to be inserted into an entry of the resource. This can allow a network controller to configure routes across a named-data network or information-centric network by disseminating packets whose instructions create the necessary entries into FIB and PIT resources across the network.

In some embodiments, parameters 364 can also include reputation criteria for the name prefix at the corresponding resource. The reputation criteria specified in parameters 364 of instruction field 360 can override global reputation criteria in the header of the packet. Alternatively, the packet can specify the resource-specific reputation criteria in parameters 364 without specifying global reputation criteria in the packet's header. This allows a packet to specify reputation criteria that is specific to a resource, and can facilitate specifying multiple resource-specific attributes when performing operations across multiple resources.

Instructions 366 can include instructions that are to be executed by the network node to perform the operation on the resource. This can allow a network node to perform pre-processing tasks before accessing the resource, or to perform post-processing tasks after accessing the resource.

Figure 3D:
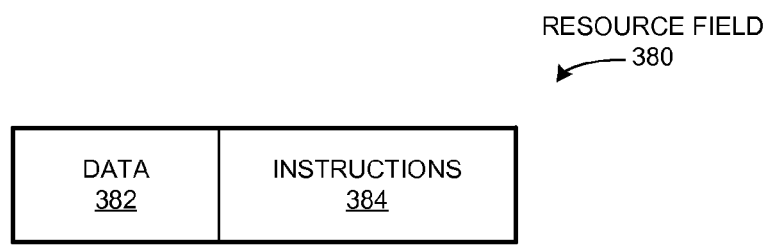
FIG. 3D illustrates an exemplary resource field that includes program instructions that are to be executed by a network node in accordance with an embodiment.

In some embodiments, a resource field may not need to include separate instruction fields for each type of CRUD function that can be performed on a resource. The resource field can include a set of instructions that form a program which operates on one or more resources to achieve a custom task. FIG. 3D illustrates an exemplary resource field 380 that includes program instructions that are to be executed by a network node in accordance with an embodiment. Resource field 380 can include a set of instructions 384 that are to be executed by a network node to process a packet, and can include data 382 that can be used by instructions 384.

FIG. 3D illustrates an exemplary resource field 380 that includes program instructions that are to be executed by a network node in accordance with an embodiment. Resource field 380 can include a set of instructions 384 that are to be executed by a network node to perform operations on a resource, and can include data 382 that can be used by instructions 384. For example, data 382 can include reputation criteria for the name prefix at the corresponding resource.

Processing a Programmable Packet with a Reputation Criteria

Figure 4:
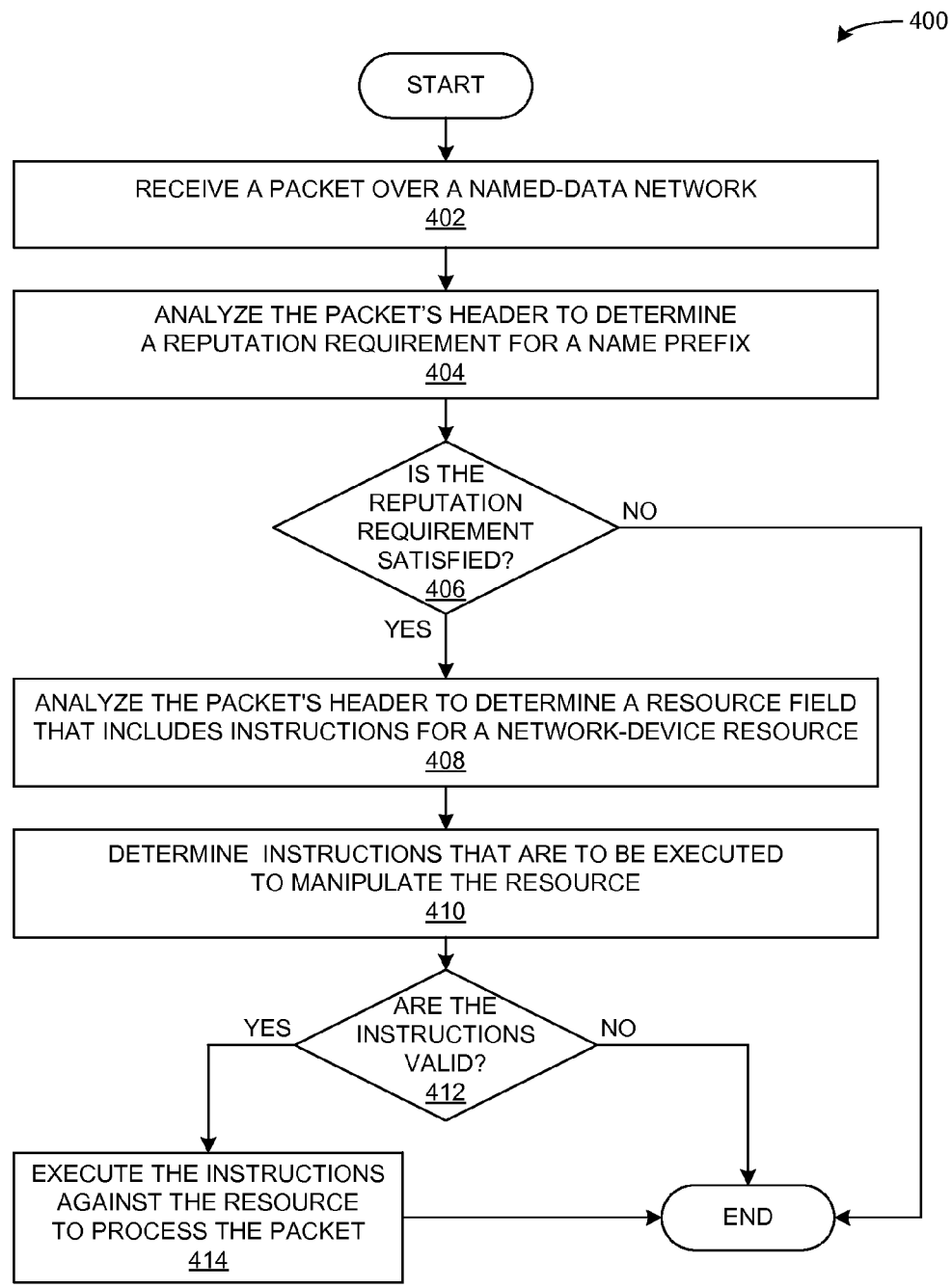
FIG. 4 presents a flow chart illustrating a method for processing a packet at a network node in accordance with an embodiment.

FIG. 4 presents a flow chart illustrating a method 400 for processing a packet at a network node in accordance with an embodiment. During operation, the system can receive a packet over a named-data network or an information-centric network (operation 402). The system can analyze the packet's header to determine reputation criteria for the packet's name prefix (operation 404), and determines whether the reputation criteria is satisfied locally (operation 406).

In some embodiments, the system can determine whether the reputation criteria is satisfied locally by computing or obtaining a reputation value for the name prefix at the resource, and determining whether the reputation value satisfies the packet's reputation criteria. The system can obtain the reputation value, for example, by accessing the reputation value from a lookup table. Alternatively, the system can compute the reputation value at runtime using up-to-date reputation information that includes a set of attribute values for the name prefix at the resource and a set of weight values that specify a weight for each attribute. If the reputation criteria are not satisfied locally, the system can stop processing the packet, or may perform a predetermined remedial action such as to log the packet in a system log or network log.

Recall that each resource field can include instructions to perform on a corresponding resource of the network device. Hence if the reputation criteria is satisfied locally, the system analyzes the packet's header to determine one or more resource fields that each corresponds to a resource of the local network node (operation 408), and analyzes each resource field to determine the instructions to execute to manipulate the corresponding resource (operation 410). The system also determines whether the instructions are valid (operation 412). For example, the system can determine whether the resource exists and is accessible by the local device, and can determine whether the instructions can be executed against the resource. Also, the system can determine whether the packet has valid access control information that grants the packet permission to execute the instructions against the resource. If the instructions are valid, the system processes the packet by executing the instructions against their corresponding resources (operation 414).

Figure 5:
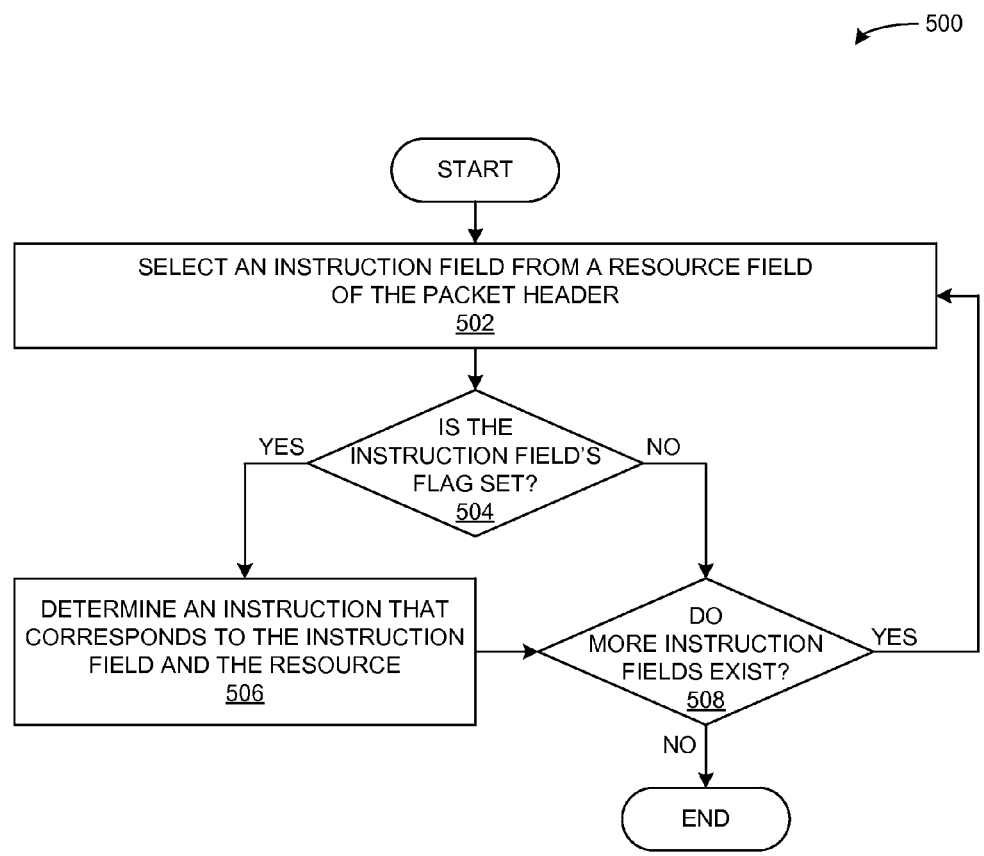
FIG. 5 presents a flow chart illustrating a method for determining instructions to execute against a network-device resource based on instruction fields for a resource in accordance with an embodiment.

FIG. 5 presents a flow chart illustrating a method 500 for determining instructions to execute against a network-device resource based on instruction fields for a resource in accordance with an embodiment. During operation, the system analyzes a packet header's resource field, and selects an instruction field to process (operation 502). Recall that each instruction field may correspond to a predetermined operation that can be performed on a resource, such as a "create," "read," "update," or "delete" operation. The instruction field can include a flag, which indicates whether the corresponding operation is to be performed on the resource. Hence, the system analyzes the flag's value to determine whether the instruction field's flag is set (operation 504).

If the instruction field's flag is set, the system determines one or more instructions that correspond to the instruction field and to the resource (operation 506). Otherwise, the system continues to determine whether more instruction fields exist in the resource field (operation 508). If more instruction fields exist, the system can return to operation 502 to select another instruction field.

In some embodiments, not all packets are allowed to perform certain operations on a resource of a network node, such as a network node's FIB, PIT, or CS. For example, a system administrator can be allowed to configure a network by disseminating packets that configure routing information into FIB entries across various packet-forwarding nodes. On the other hand, a typical client device should not be allowed to build or tear down network paths that the client device does not control. Hence, the system should only execute an instruction against a local resource to process a packet if the packet has the required privileges.

Figure 6:
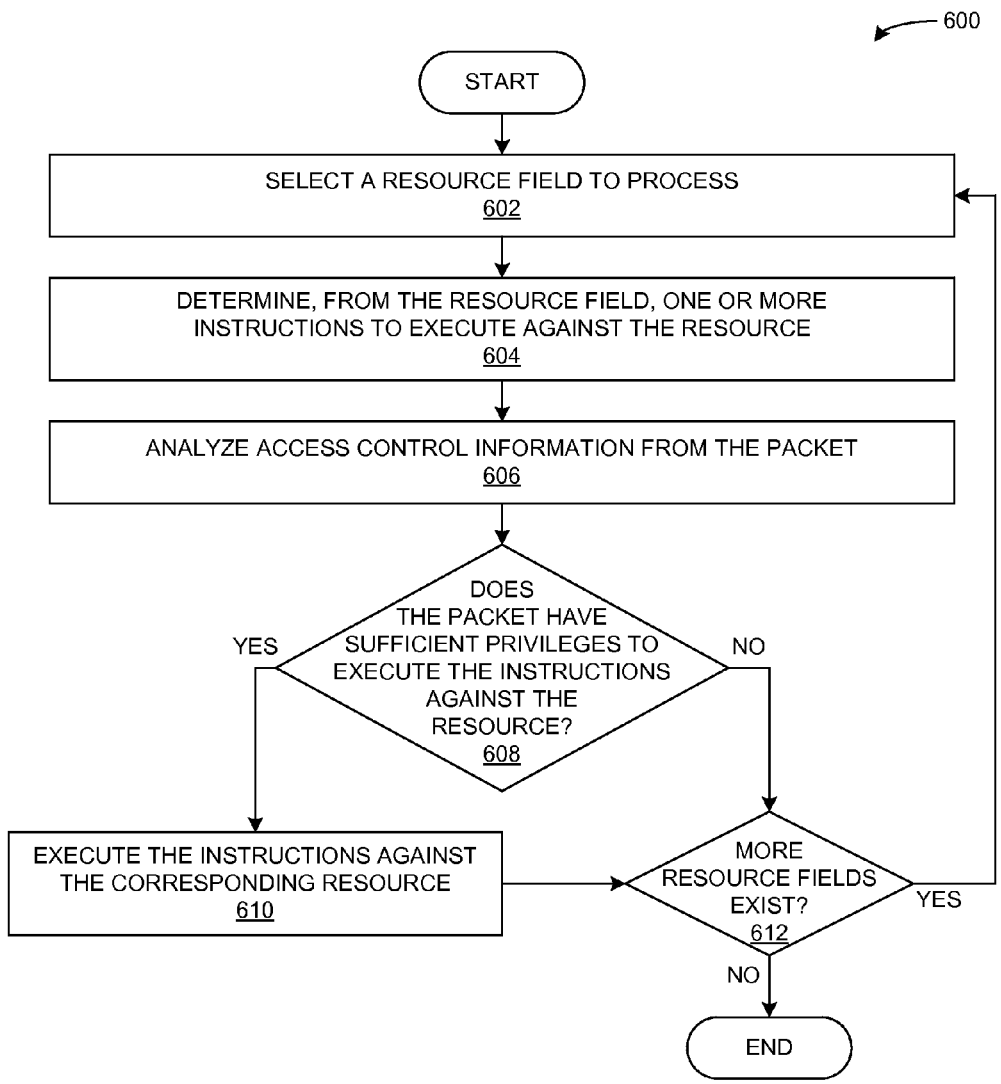
FIG. 6 presents a flow chart illustrating a method for enforcing a security policy when determining which operations to perform on a network node's resources in accordance with an embodiment.

FIG. 6 presents a flow chart illustrating a method 600 for enforcing a security policy when determining which operations to perform on a network node's resources in accordance with an embodiment. During operation, the system selects a resource field to process (operation 602), and determines one or more instructions to execute against the corresponding resource (operation 604).

The system also analyzes access control information from the packet (operation 606), and determines whether the packet has sufficient privileges to execute the instructions against the resource (operation 608). If so, the system proceeds to execute the instructions against the corresponding resource (operation 610). Otherwise, the system proceeds to determine whether there are more resource fields to process (operation 612). If the header has more resource fields, the system returns to operation 602 to select another resource field to process.

Sharing Reputation Information

In some embodiments, network nodes can share reputation information for a name prefix with their neighboring nodes. This reputation information can include a reputation value, as well as the attribute values and weights used to compute the reputation value. A network node can determine a reputation value for a local face from reputation information gathered from neighboring nodes. For example, the local node can obtain reputation values for a local face from a remote device accessible via the face, without having to compute the reputation values locally. Alternatively, the node can use the attribute values obtained from a remote device to compute a reputation value that corresponds to a predetermined objective (e.g., security, or performance). To share the reputation information, a system administrator can disseminate a programmable packet that configures network nodes to send their reputation information to their neighbors. This packet can configure a network node to generate a packet that includes the reputation information, as well as the instructions to configure the neighbor to share its reputation information with its neighbors.

For example, two nodes A and B may each have a face to a node C. Nodes A and B may compute reputation values for a name prefix based on the data packets (e.g., CCN Content Objects) that have been received via one or more faces. Nodes A and B may also communicate these reputation values for the name prefix, along with the attribute values and weights used to compute the reputation values, to node C. This reputation information may correspond to an average or median reputation value for all content that falls under the name prefix, or may correspond to a minimum or maximum reputation value, or a reputation value range for the content.

Node C can receive a packet that specifies the reputation information for the name prefix from nodes A and B. Node C can store the reputation information from node B in association with the name prefix and a face to node B, and can store the reputation information from node C in association with the name prefix and a face to node C.

Figure 7:
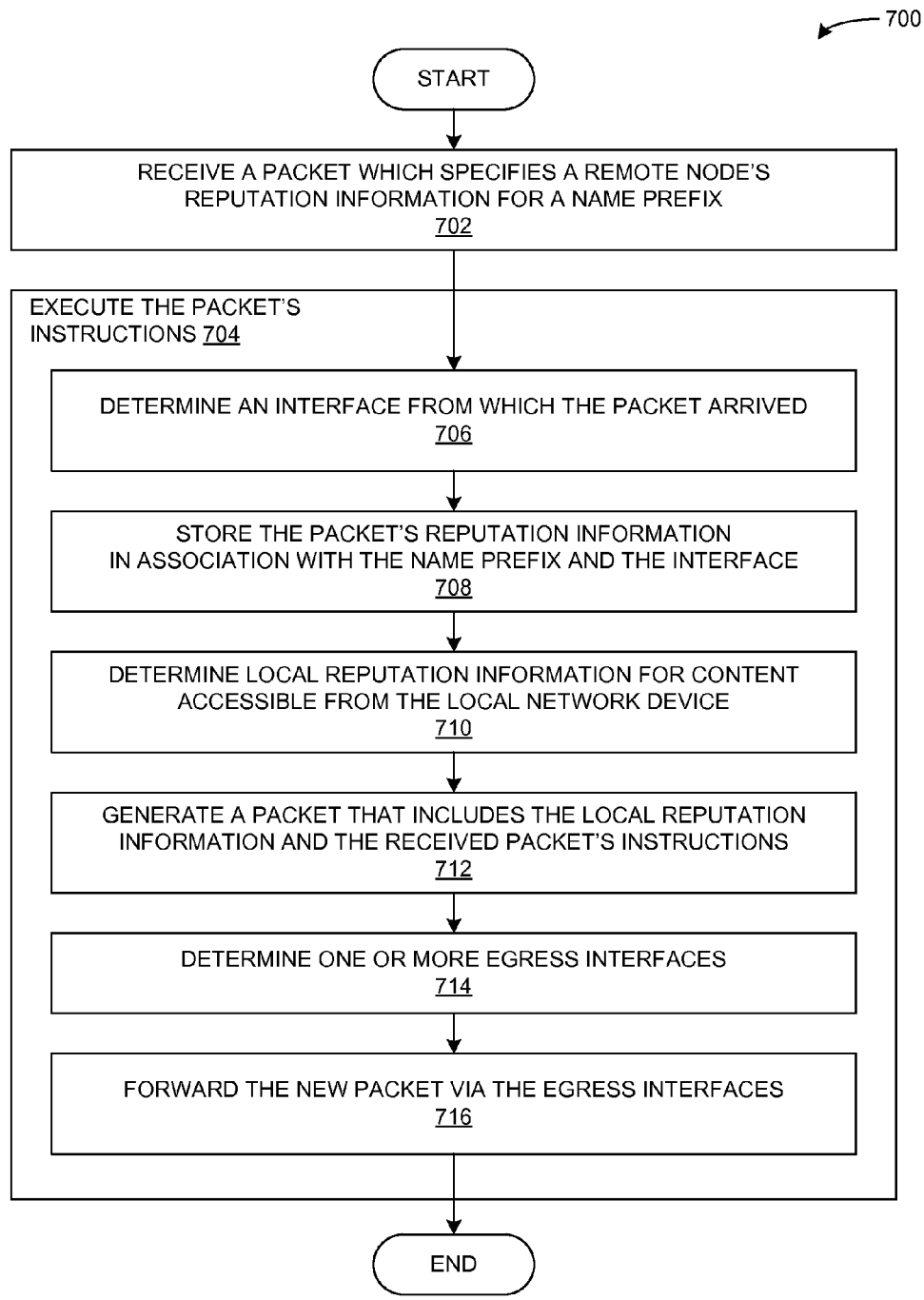
FIG. 7 presents a flow chart illustrating a method for processing a packet that specifies reputation values from a remote network node in accordance with an embodiment.

FIG. 7 presents a flow chart illustrating a method 700 for processing a packet that specifies reputation information from a remote network node in accordance with an embodiment. A piece of reputation information includes a reputation value, as well as the attribute values and weights used to compute the reputation value. During operation, a network node can receive a packet which specifies a remote node's reputation information for a name prefix, and which includes instructions for processing the packet's reputation information and sharing local reputation information with other neighboring nodes (operation 702). The network node can execute the packet's instructions (operation 704) to determine a face from which the packet arrived (operation 706), and store the packet's reputation information in association with the name prefix and the face (operation 708).

The network node can also determine local reputation information for content accessible from the local network device (operation 710), and generates a packet that includes the reputation information as well as the received packet's instructions (operation 712). The network node then determines one or more egress faces (operation 714), and forwards the new packet via the one or more egress faces (operation 716).

In some embodiments, a network node can also share reputation information for a name prefix/face combination with a neighboring node associated with the face. This allows the network node to inform the neighboring node of reputation degradation for a name prefix from its face, which allows the neighboring node to isolate and correct the issue that produced a lower reputation. Hence, network nodes can become aware of the reputation values that its neighbors have computed for a name prefix from the network node, and can perform a remedial action when the neighbors' reputation values for the network node do not match the local reputation values for the name prefix.

Figure 8:
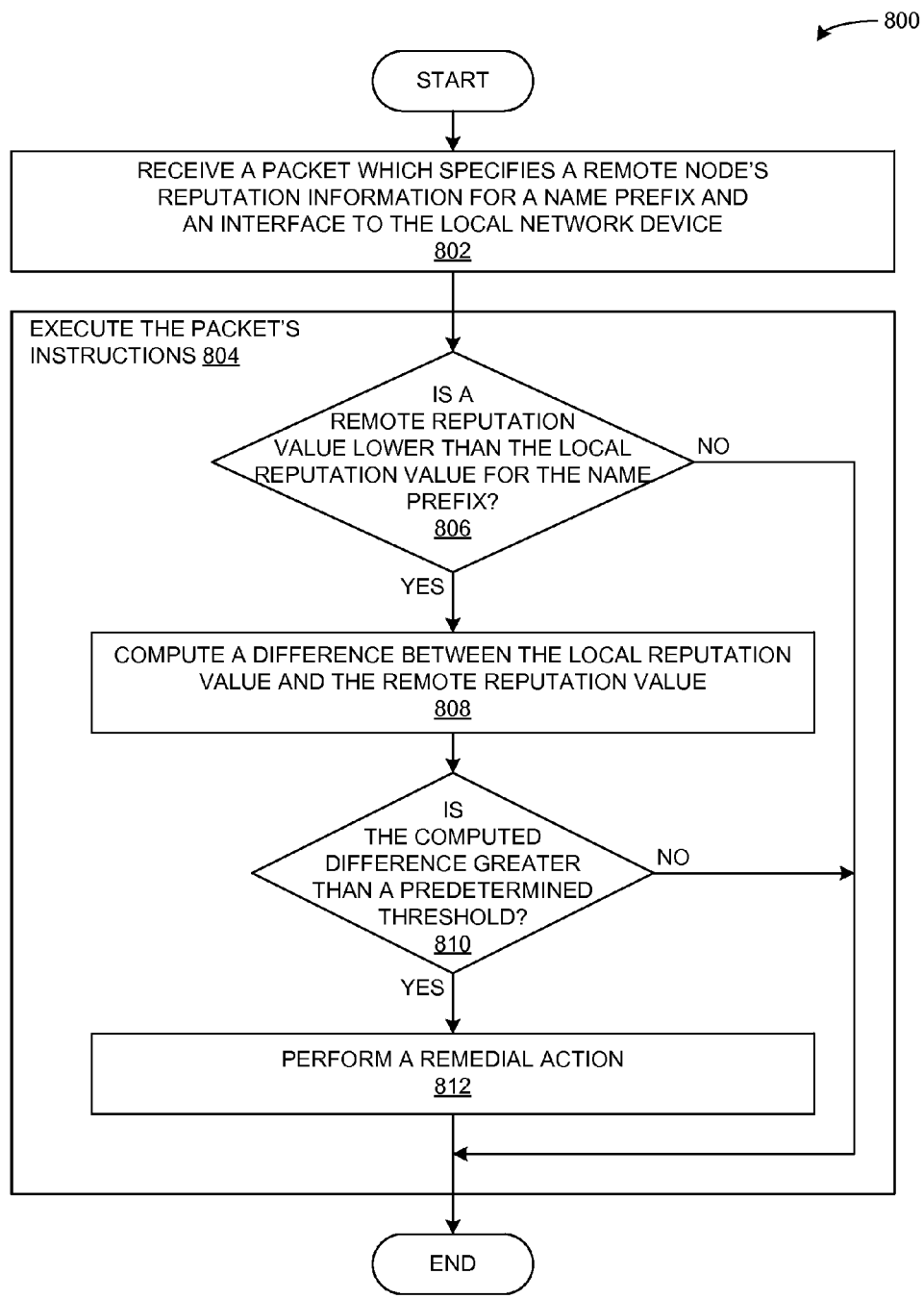
FIG. 8 presents a flow chart illustrating a method for processing a packet that specifies reputation values for a face to the local network node in accordance with an embodiment.

FIG. 8 presents a flow chart illustrating a method 800 for processing a packet that specifies reputation information for a face to the local network node in accordance with an embodiment. During operation, the system can receive a packet which specifies a remote node's reputation information for a name prefix and a face to the local network device (operation 802). The packet can also include instructions for processing the packet's reputation information, and performing a remedial action to rectify undesirably low reputation values. The network node can execute the packet's instructions (operation 804) to determine whether a remote reputation value obtained or computed from this reputation information is lower than a local reputation value for the name prefix (operation 806). The remote reputation value may be a remote-computed reputation value included in the reputation information, or may be a reputation value computed locally using attribute values and/or weights from the reputation information.

If the remote reputation value is lower than a local reputation value for the name prefix, the network device can determine whether the reputation value is undesirably low. For example, the network device can compute a difference between the local reputation value and the remote reputation value (operation 808), and determines whether the computed difference is greater than a predetermined threshold (operation 810). If the difference is below the predetermined threshold, the network device can perform a remedial action designed to rectify the difference between the remote-computed reputation value for the name prefix and the local reputation value (operation 812). The remedial action can include diagnosing a reason for the difference in reputation values, informing one or more faces associated with the name prefix of the reputation value to their face, and/or adjusting QoS parameters to receive content associated with the name prefix from a face with a higher reputation value.

For example, node C may have computed a 75% reputation value for content under the name prefix "/bbc/headlines." If a node A reports to node C that the reputation value for a name prefix "/bbc/headlines" from a face to node C has dropped from 80% to 40%, node C can perform a diagnostics check to determine the reason why the performance value dropped for the name prefix.

Node C may obtain content under the name prefix "/bbc/headlines" from a face to a node D. If node C determines that the face to node D has a reputation value of 80% for name prefix "/bbc/headlines," node C may investigate whether determine that node C has become compromised, or whether a link between node A and node C has been compromised or degraded. However, if node C determines that the face to node D has a reputation value of 40% for name prefix "/bbc/headlines," node C may decide to receive content for this name prefix from another face (e.g., another face with a higher reputation value). Node D can alternatively or additionally inform node D of its low reputation value to allow node D to investigate and rectify its low reputation value for the name prefix.

Figure 9:
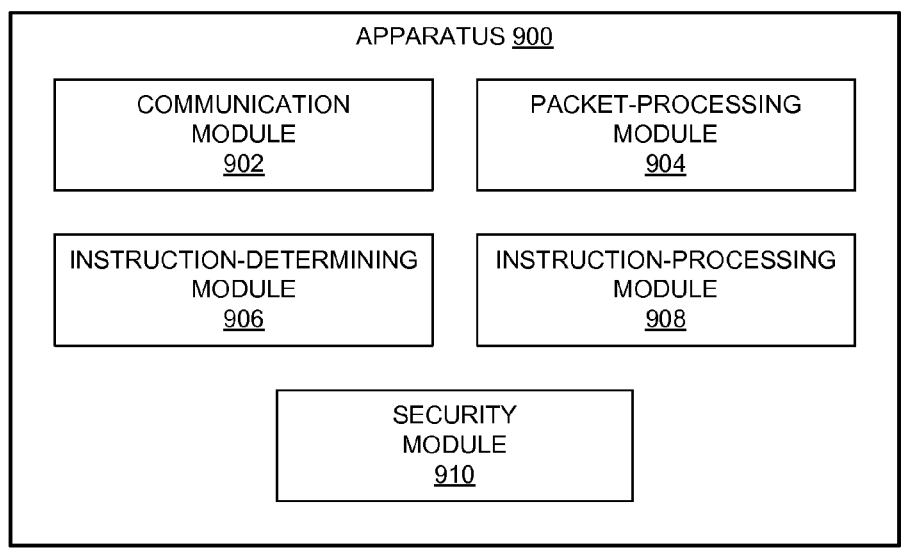
FIG. 9 illustrates an exemplary apparatus that facilitates processing a programmable packet based on the packet's reputation criteria in accordance with an embodiment.

FIG. 9 illustrates an exemplary apparatus 900 that facilitates forwarding a packet based on instructions included in the packet in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a communication module 902, a packet-processing module 904, an instruction-determining module 906, an instruction-processing-module 908, and a security module 910.

In some embodiments, communication module 902 can receive a packet that includes a header comprising reputation criteria and one or more resource fields that each includes instructions to execute against a corresponding resource. Packet-processing module 904 can determine whether a reputation value for the packet's name prefix satisfies the packet's reputation criteria, and if so, selects a resource field that includes instructions to execute against a corresponding resource.

Instruction-determining module 906 can analyze the resource field to determine the one or more instructions that are to be executed, and instruction-processing module 908 can execute the instructions to manipulate the resource. Security module 910 can determine whether the access control information grants the packet permission to access the resource, and if so, can configure the instruction-processing module to execute the instructions.

Figure 10:
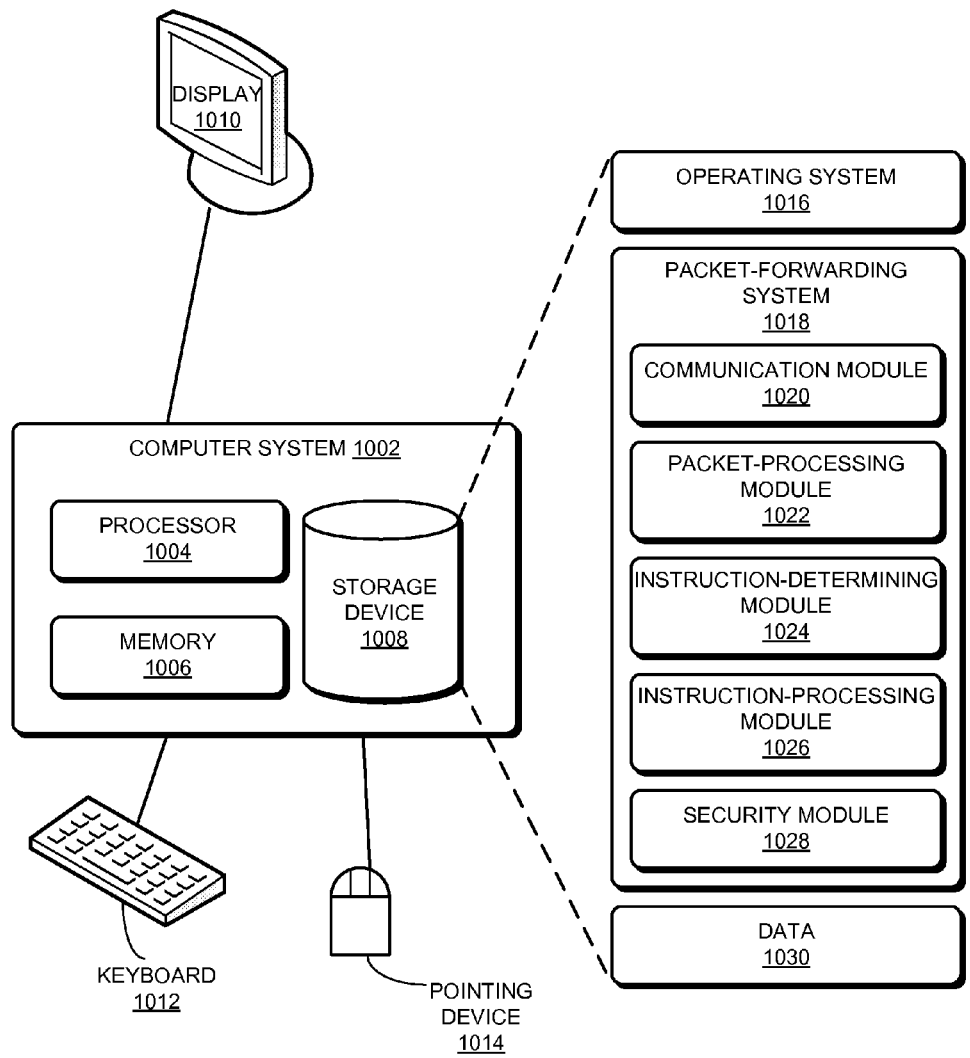
FIG. 10 illustrates an exemplary computer system that facilitates processing a programmable packet based on the packet's reputation criteria in accordance with an embodiment.

FIG. 10 illustrates an exemplary computer system 1002 that facilitates forwarding a packet based on instructions included in the packet in accordance with an embodiment. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store operating system 1016, packet-forwarding system 1018, and data 1030.

Packet-forwarding system 1018 can include instructions, which when executed by computer system 1002, can cause computer system 1002 to perform methods and/or processes described in this disclosure. Specifically, packet-forwarding system 1018 may include instructions for receiving a packet that includes a header comprising reputation criteria and one or more resource fields that each includes instructions to execute against a corresponding resource (communication module 1020). Further, packet-forwarding system 1018 can include instructions for determining whether a reputation value for the packet's name prefix satisfies the packet's reputation criteria, and if so, selecting a resource field that includes instructions to execute against a corresponding resource (packet-processing module 1022).

Packet-forwarding system 1018 can also include instructions for analyzing the resource field to determine the one or more instructions that are to be executed (instruction-determining module 1024), and can include instructions for executing the instructions on the resource (instruction-processing module 1026). Packet-forwarding system 1018 can also include instructions for determining whether the access control information grants the packet permission to access the resource, and for configuring the instruction-processing module to execute the commands if the access control information does grant permission to access the resource (security module 1028).

Data 1030 can include any data that is required as input or that is generated as output by the methods and/or processes described in this disclosure. Specifically, data 1030 can store at least a FIB, a PIT, a CS, and information necessary for performing operations on the FIB, the PIT, and/or the CS.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
  receiving a packet by a network device, wherein the packet includes a name or a name prefix, and includes a header comprising one or more resource fields, and wherein a respective resource field in the one or more resource fields includes one or more instructions that perform an operation on a corresponding resource of the computing device;
  analyzing the packet to determine a criterion to be satisfied by a local reputation value for the packet's name prefix;
  determining the local reputation value for the name prefix at the local network device, which involves computing a set of reputation values for a collection of Content Objects associated with the name prefix, which have been received or cached by the local network device, and wherein the local reputation value includes a univariate statistic for the set of reputation values; and
  responsive to determining that the local reputation value for the name prefix satisfies the criterion, executing the one or more instructions of the respective resource field to perform the operation on the corresponding resource.

2. The method of claim 1, wherein the criterion includes at least one of:
    a minimum reputation value;
    a maximum reputation value;
    a range of reputation values.

3. The method of claim 1,
    wherein the univariate statistic for the set of reputation values for the collection of Content Objects includes at least one of:
        a median reputation value of the collection;
        a mean reputation value of the collection;
        a highest reputation value of the collection;
        a lowest reputation value of the collection; and
        a range of reputation values for the collection.

4. The method of claim 1, wherein the packet also includes reputation information for the name prefix, and wherein executing the one or more instructions involves:
    determining an interface from which the packet arrived; and
    storing the packet's reputation information in association with the name prefix and the interface.

5. The method of claim 4, wherein the reputation information includes at least one of:
    a reputation value;
    a set of attribute values; and
    a set of attribute weights.

6. The method of claim 1, wherein the packet also includes remote reputation information for Content Objects of the name prefix from the local network device, and wherein executing the one or more instructions involves:
    determining whether a reputation value obtained or computed from the remote reputation information is lower than the local reputation value for the name prefix;
    computing a difference between the local reputation value for the name prefix and the remote-computed reputation value; and
    performing a remedial action responsive to the reputation value from the remote reputation information being lower than the local reputation value, and the computed difference being greater than a predetermined threshold.

7. The method of claim 6, wherein performing the remedial action involves at least one of:
    diagnosing a reason for the difference in reputation values;
    sending a face's reputation information for the name prefix via the face to inform a neighboring node of its reputation value for the name prefix; and
    adjusting QoS parameters to receive content associated with the name prefix from a face with a highest reputation value.

8. The method of claim 1, wherein the resource includes at least one of:
    a forwarding information base (FIB);
    a pending interest table (PIT);
    a content store (CS);
    a processing unit;
    a memory;
    a virtual memory;
    a storage device;
    a network interface; and
    a virtual interface.

9. The method of claim 1, wherein the instruction includes at least one of:
    a create instruction for creating a new entry in the resource;
    a read instruction for reading an entry of the resource;
    an update instruction for updating an existing entry of the resource; and
    a delete instruction for deleting an existing entry of the resource.

10. A non-transitory computer-readable storage medium storing instructions that when executed by a computer cause the computer to perform a method, the method comprising:
    receiving a packet that includes a name or a name prefix, and includes a header comprising one or more resource fields, wherein a respective resource field in the one or more resource fields includes one or more instructions that perform an operation on a corresponding resource of the computing device;
    analyzing the packet to determine a criterion to be satisfied by a local reputation value for the packet's name prefix;
    determining the local reputation value for the name prefix at the local network device, which involves computing a set of reputation values for a collection of Content Objects associated with the name prefix, which have been received or cached by the local network device, and wherein the local reputation value includes a univariate statistic for the set of reputation values; and
    responsive to determining that the local reputation value for the name prefix satisfies the criterion, executing the one or more instructions of the respective resource field to perform the operation on the corresponding resource.

11. The storage medium of claim 10, wherein the criterion includes at least one of:
    a minimum reputation value;
    a maximum reputation value;
    a range of reputation values.

12. The storage medium of claim 10,
    wherein the univariate statistic for the set of reputation values for the collection of Content Objects includes at least one of:
        a median reputation value of the collection;
        a mean reputation value of the collection;
        a highest reputation value of the collection;
        a lowest reputation value of the collection; and
        a range of reputation values for the collection.

13. The storage medium of claim 10, wherein the packet also includes reputation information for the name prefix, and wherein executing the one or more instructions involves:
    determining an interface from which the packet arrived; and
    storing the packet's reputation information in association with the name prefix and the interface.

14. The storage medium of claim 10, wherein the packet also includes remote reputation information for Content Objects of the name prefix from the local network device, and wherein executing the one or more instructions involves:
    determining whether a reputation value obtained or computed from the remote reputation information is lower than the local reputation value for the name prefix;
    computing a difference between the local reputation value for the name prefix and the remote-computed reputation value; and
    performing a remedial action responsive to the reputation value from the remote reputation information being lower than the local reputation value, and the computed difference being greater than a predetermined threshold.

15. The storage medium of claim 14, wherein performing the remedial action involves at least one of:
    diagnosing a reason for the difference in reputation values;

sending a face's reputation information for the name prefix via the face to inform a neighboring node of its reputation value for the name prefix; and adjusting QoS parameters to receive content associated with the name prefix from a face with a highest reputation value.

16. The storage medium of claim 10, wherein the resource includes at least one of:
   a forwarding information base (FIB);
   a pending interest table (PIT);
   a content store (CS);
   a processing unit;
   a memory;
   a virtual memory;
   a storage device;
   a network interface; and
   a virtual interface.

17. The storage medium of claim 10, wherein the instruction includes at least one of:
   a create instruction for creating a new entry in the resource;
   a read instruction for reading an entry of the resource;
   an update instruction for updating an existing entry of the resource; and
   a delete instruction for deleting an existing entry of the resource.

18. A computing system comprising:
   one or more processors;
   a memory; and
   a computer-readable medium coupled to the one or more processors storing instructions stored that, when executed by the one or more processors, cause the computing system to perform a method comprising:
   receiving a packet that includes a name or a name prefix, and includes a header comprising one or more resource fields, wherein a respective resource field in the one or more resource fields includes one or more instructions that perform an operation on a corresponding resource of the computing device;
   analyzing the packet to determine a criterion to be satisfied by a local reputation value for the packet's name prefix;
   determining the local reputation value for the name prefix at the local network device, which involves computing a set of reputation values for a collection of Content Objects associated with the name prefix, which have been received or cached by the local network device, and wherein the local reputation value includes a univariate statistic for the set of reputation values; and
   responsive to determining that the local reputation value for the name prefix satisfies the criterion, executing the one or more instructions of the respective resource field to perform the operation on the corresponding resource.

19. The computing system of claim 18, wherein the criterion includes at least one of:
   a minimum reputation value;
   a maximum reputation value;
   a range of reputation values.

20. The computing system of claim 18, wherein the univariate statistic for the set of reputation values for the collection of Content Objects includes at least one of:
   a median reputation value of the collection;
   a mean reputation value of the collection;
   a highest reputation value of the collection;
   a lowest reputation value of the collection; and
   a range of reputation values for the collection.

21. The computing system of claim 18, wherein the packet also includes reputation information for the name prefix, and wherein executing the one or more instructions involves:
   determining an interface from which the packet arrived; and
   storing the packet's reputation information in association with the name prefix and the interface.

22. The computing system of claim 18, wherein the packet also includes remote reputation information for Content Objects of the name prefix from the local network device, and wherein executing the one or more instructions involves:
   determining whether a reputation value obtained or computed from the remote reputation information is lower than the local reputation value for the name prefix;
   computing a difference between the local reputation value for the name prefix and the remote-computed reputation value; and
   performing a remedial action responsive to the reputation value from the remote reputation information being lower than the local reputation value, and the computed difference being greater than a predetermined threshold.

23. The computing system of claim 22, wherein performing the remedial action involves at least one of:
   diagnosing a reason for the difference in reputation values;
   sending a face's reputation information for the name prefix via the face to inform a neighboring node of its reputation value for the name prefix; and
   adjusting QoS parameters to receive content associated with the name prefix from a face with a highest reputation value.

24. The computing system of claim 18, wherein the resource includes at least one of:
   a forwarding information base (FIB);
   a pending interest table (PIT);
   a content store (CS);
   a processing unit;
   a memory;
   a virtual memory;
   a storage device;
   a network interface; and
   a virtual interface.

25. The computing system of claim 18, wherein the instruction includes at least one of:
   a create instruction for creating a new entry in the resource;
   a read instruction for reading an entry of the resource;
   an update instruction for updating an existing entry of the resource; and
   a delete instruction for deleting an existing entry of the resource.

* * * * *